United States Patent
Pierpont et al.

(10) Patent No.: US 6,912,458 B2
(45) Date of Patent: Jun. 28, 2005

(54) VARIABLE VALVE ACTUATION CONTROL FOR OPERATION AT ALTITUDE

(75) Inventors: David A. Pierpont, Dunlap, IL (US); Thomas J. Crowell, Metamora, IL (US)

(73) Assignee: Caterpillar Inc, Peoria, IL (US)

(*) Notice: Subject to any disclaimer, the term of this patent is extended or adjusted under 35 U.S.C. 154(b) by 7 days.

(21) Appl. No.: 10/602,662

(22) Filed: Jun. 25, 2003

(65) Prior Publication Data

US 2004/0267431 A1 Dec. 30, 2004

(51) Int. Cl.[7] .............................. F01L 13/00; F01L 1/34
(52) U.S. Cl. ...................... 701/102; 701/115; 123/90.17
(58) Field of Search ................................. 701/102, 115; 123/90.15, 90.16, 90.17

(56) References Cited

U.S. PATENT DOCUMENTS

| | | | |
|---|---|---|---|
| 3,250,068 A | 5/1966 | Vulliamy | |
| 4,424,790 A | 1/1984 | Curtil | |
| 4,561,253 A | 12/1985 | Curtil | |
| 4,815,423 A | 3/1989 | Holmer | |
| 5,408,979 A | 4/1995 | Backlund et al. | |
| 5,445,128 A | 8/1995 | Letang et al. | |
| 5,682,854 A | 11/1997 | Ozawa | |
| 5,927,075 A | 7/1999 | Khair | |
| 6,006,706 A * | 12/1999 | Kanzaki | 123/90.16 |
| 6,026,786 A | 2/2000 | Groff et al. | |
| 6,082,328 A | 7/2000 | Meistrick et al. | |
| 6,170,441 B1 | 1/2001 | Haldeman et al. | |
| 6,209,516 B1 | 4/2001 | Yamashita | |
| 6,213,069 B1 * | 4/2001 | Wada et al. | 123/90.17 |
| 6,237,551 B1 | 5/2001 | Macor et al. | |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,360,531 B1 * | 3/2002 | Wiemero et al. | 123/90.15 |
| 6,467,452 B1 | 10/2002 | Duffy et al. | |
| 6,571,765 B2 | 6/2003 | Kuboshima et al. | |
| 6,651,618 B1 | 11/2003 | Coleman et al. | |
| 6,688,280 B2 | 2/2004 | Weber et al. | |

FOREIGN PATENT DOCUMENTS

| | | | |
|---|---|---|---|
| EP | 1 389 673 A2 * | 2/2004 | ............. F01L/1/34 |
| JP | 05106415 A2 | 4/1993 | |
| JP | 2000120457 A | 4/2000 | |
| JP | 2000145484 A | 5/2000 | |
| WO | WO 98/02653 | 1/1998 | |

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23–26, 1998, pp. 1–19.

(Continued)

Primary Examiner—Hieu T. Vo
(74) Attorney, Agent, or Firm—Finnegan, Henderson, Farabow, Garrett & Dunner

(57) ABSTRACT

A method of controlling a variable valve actuation system for an engine is provided. A cam assembly is operated to move an intake valve between a first position and a second position. A parameter indicative of an altitude at which the engine is operating is sensed. A first lookup map is accessed to determine a desired air-to-fuel ratio when the sensed parameter indicates that the engine is operating at an altitude below a first predetermined value. A second lookup map is accessed to determine a desired air-to-fuel ratio when the sensed parameter indicates that the engine is operating at an altitude above the first predetermined value. A desired valve actuation period is determined based on the determined air-to-fuel ratio. The intake valve is prevented from returning to the first position until the end of the determined valve actuation period.

22 Claims, 7 Drawing Sheets

OTHER PUBLICATIONS

Obert, "Internal Combustion Engines and Air Pollution," Based on Internal Combustion Engines, Third Edition, 1973, pp. 612–614.

Challen et al., "Diesel Engine Reference Book, Section Edition, "SAE International, 1999, pp. 75, 81, 84, 146, and 263–305.

Yorihiro Fukuzawa et al., "Development of High Efficiency Miller Cycle Gas Engine", Mitsubishi Heavy Industries, Ltd. Technical Review, vol. 38, No. 3, Oct. 2001, pp. 146–150.

Request for *Inter Paries* Reexamination Transmittal Form for U.S. Appl. No. 6,688,280, and Attachment to Request for Inter Parties Reexamination Transmittal Form, Sep. 17, 2004.

Request for *Inter Paries* Reexamination Transmittal Form for U.S. Appl. No. 6,651,618, and Attachment to Request for Inter Parties Reexamination Transmittal Form, Aug. 27, 2004 http://www.mazda.com.au/corpora/209.html, Oct. 16, 2001, pp. 1–6.

\* cited by examiner

VARIABLE VALVE ACTUATION CONTROL FOR OPERATION AT ALTITUDE

TECHNICAL FIELD

The present invention is directed to a system and method for controlling a variable valve actuation system and, more particularly, to a system and method for controlling a variable valve actuation system to account for altitude operating conditions.

BACKGROUND

The performance of an internal combustion engine, such as, for example, a diesel, gasoline, or natural gas engine may be impacted by the conditions under which the engine is operated. For example, the performance of an internal combustion engine may change as the altitude at which the engine is operated increases. In particular, the operation of the engine at higher altitudes may cause a decrease in fuel efficiency and/or an increase in the generation of undesirable emissions.

The impact of altitude on engine performance results from the decrease in air density and air pressure at higher altitudes. The decrease in air density and air pressure at higher altitudes causes a reduction in the air-fuel ratio provided to the engine, a reduction in the efficiency of an associated turbocharger system, and a reduction in the combustion efficiency within the engine. The reduction in each of these parameters may result in a decreased fuel efficiency and/or increased emission generation.

Generally, an internal combustion engine operates on a selected air-to-fuel ratio regardless of the altitude at which the engine is operating. The operating air-to-fuel ratio is selected to meet certain fueling and power requirements and may depend upon the current engine speed and load. The selected air-to-fuel ratio may be achieved by actuating the engine valve for a certain period of time and by injecting a certain amount of fuel into a cylinder. However, when the engine is operating at a high altitude where the air density and pressure is reduced, less air will pass by the engine valves during a given time period. Accordingly, the air-to-fuel ratio supplied to the engine will decrease as the altitude of operation increases.

The air-to-fuel ratio is a critical component of an internal combustion engine, such as, for example, a diesel engine. A reduction in the air-to-fuel ratio typically translates to a reduction in the efficiency of combustion. Usually, the reduced air-to-fuel ratio reduces the rate of combustion and also reduces the amount of the combustion energy that may be translated to mechanical work. When less combustion energy is translated to work, the fuel efficiency of the engine decreases and the temperature of the exhaust gas increases.

A turbocharger system may be added to the internal combustion engine to improve the performance of the engine. The turbocharger system recovers energy from the exhaust stream and uses the recovered energy to increase the pressure of the air in the intake stream. The increased intake air pressure may result in more air being pushed into the combustion chamber and thereby increase the air-to-fuel ratio.

However, under standard operating conditions, a typical turbocharger system is approximately 60–65% effective, which means that only 60–65% of the recovered energy is applied to the intake air flow. The lower density of the air at high altitudes further reduces the efficiency of the turbocharger. Thus, not all of the increased exhaust gas energy is translated to increased intake manifold pressure. Accordingly, the turbocharger will not compensate for all losses associated with operating at higher altitudes.

The system and method of the present invention solves one or more of the problems set forth above.

SUMMARY OF THE INVENTION

In one aspect, the present invention is directed to a method of controlling a variable valve actuation system. A cam assembly is operated to move an intake valve between a first position where the intake valve blocks a flow of fluid and a second position where the intake valve allows a flow of fluid. A parameter indicative of an altitude at which the engine is operating is sensed. A first lookup map is accessed to determine a desired air-to-fuel ratio when the sensed parameter indicates that the engine is operating at an altitude below a first predetermined value. A second lookup map is accessed to determine a desired air-to-fuel ratio when the sensed parameter indicates that the engine is operating at an altitude above the first predetermined value. A desired valve actuation period is determined based on the determined air-to-fuel ratio. The valve actuator prevents the intake valve from returning to the first position in response to operation of the cam assembly. The valve actuator is released to allow the intake valve to return to the first position at the end of the determined valve actuation period.

In another aspect, the present invention is directed to an intake valve actuation system for an engine. An intake valve is moveable between a first position where the intake valve prevents a flow of fluid and a second position where the intake valve allows a flow of fluid. A cam assembly is connected to the intake valve to move the intake valve between the first position and the second position. A valve actuator selectively engages the intake valve and prevent the intake valve from returning to the first position. A sensor senses a parameter indicative of an altitude at which the engine is operating. A controller that has a memory is adapted to store a first lookup map and a second lookup map. The controller accesses the first lookup map to determine a desired air-to-fuel ratio when the sensed parameter indicates that the engine is operating at an altitude below a first predetermined value and accesses the second lookup map to determine a desired air-to-fuel ratio when the sensed parameter indicates that the engine is operating at an altitude above the first predetermined value. The controller determines a desired valve actuation period based on the determined air-to-fuel ratio and prevents the intake valve from returning to the first position until the end of the determined valve actuation period.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
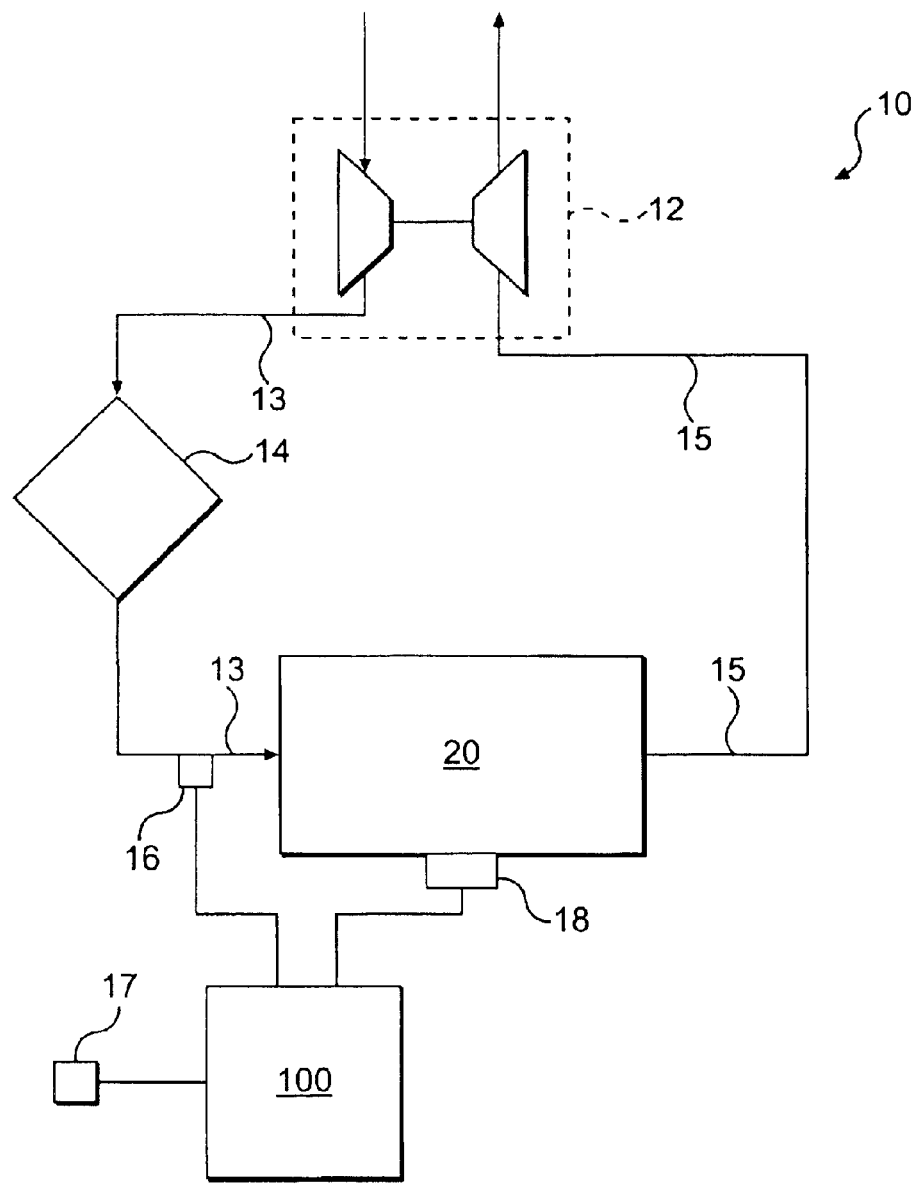
FIG. 1 is a diagrammatic and schematic representation of an engine system in accordance with an exemplary embodiment of the present invention.

An exemplary embodiment of an engine system 10 is illustrated in FIG. 1. Engine system 10 includes an intake air passageway 13 that leads to an engine 20. One skilled in the art will recognize that engine system 10 may include various components, such as, for example, a turbocharger 12 and an aftercooler 14. An exhaust air passageway 15 may lead from engine 20 to turbocharger 12.

Figure 2:
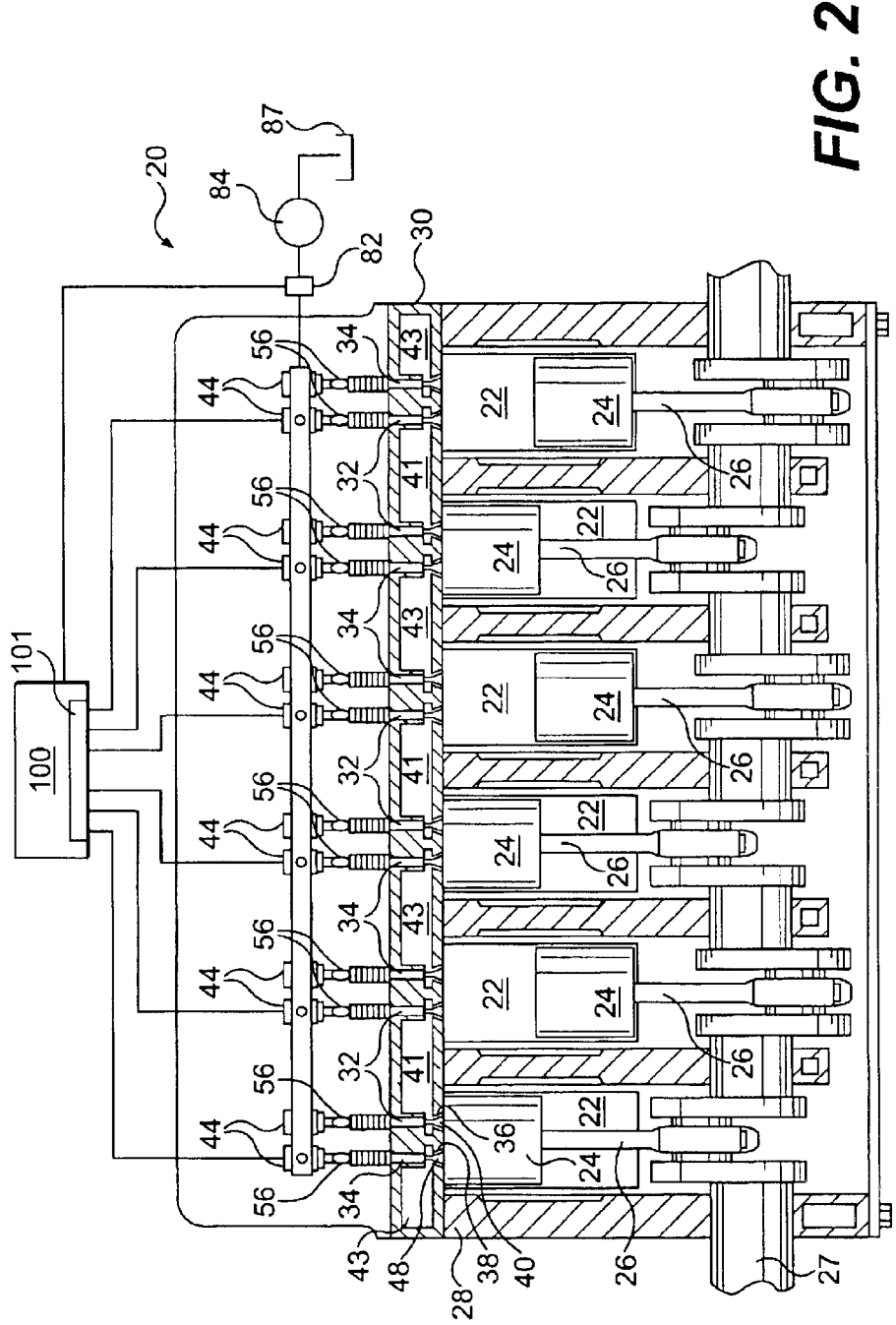
FIG. 2 is a diagrammatic cross-sectional view of an internal combustion engine in accordance with an exemplary embodiment of the present invention.

Engine 20 may be an internal combustion engine as illustrated in FIG. 2. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

As illustrated in FIG. 2, engine 20 includes an engine block 28 that defines a plurality of cylinders 22. A piston 24 is disposed for sliding movement between a top dead center position and a bottom dead center position within each cylinder 22. In the illustrated embodiment, engine 20 includes six cylinders 22 and six associated pistons 24. One skilled in the art will recognize that engine 20 may include a greater or lesser number of pistons 24 and that pistons 24 may be disposed in an "in-line" configuration, a "V" configuration, or any other conventional configuration.

As also shown in FIG. 2, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 3:
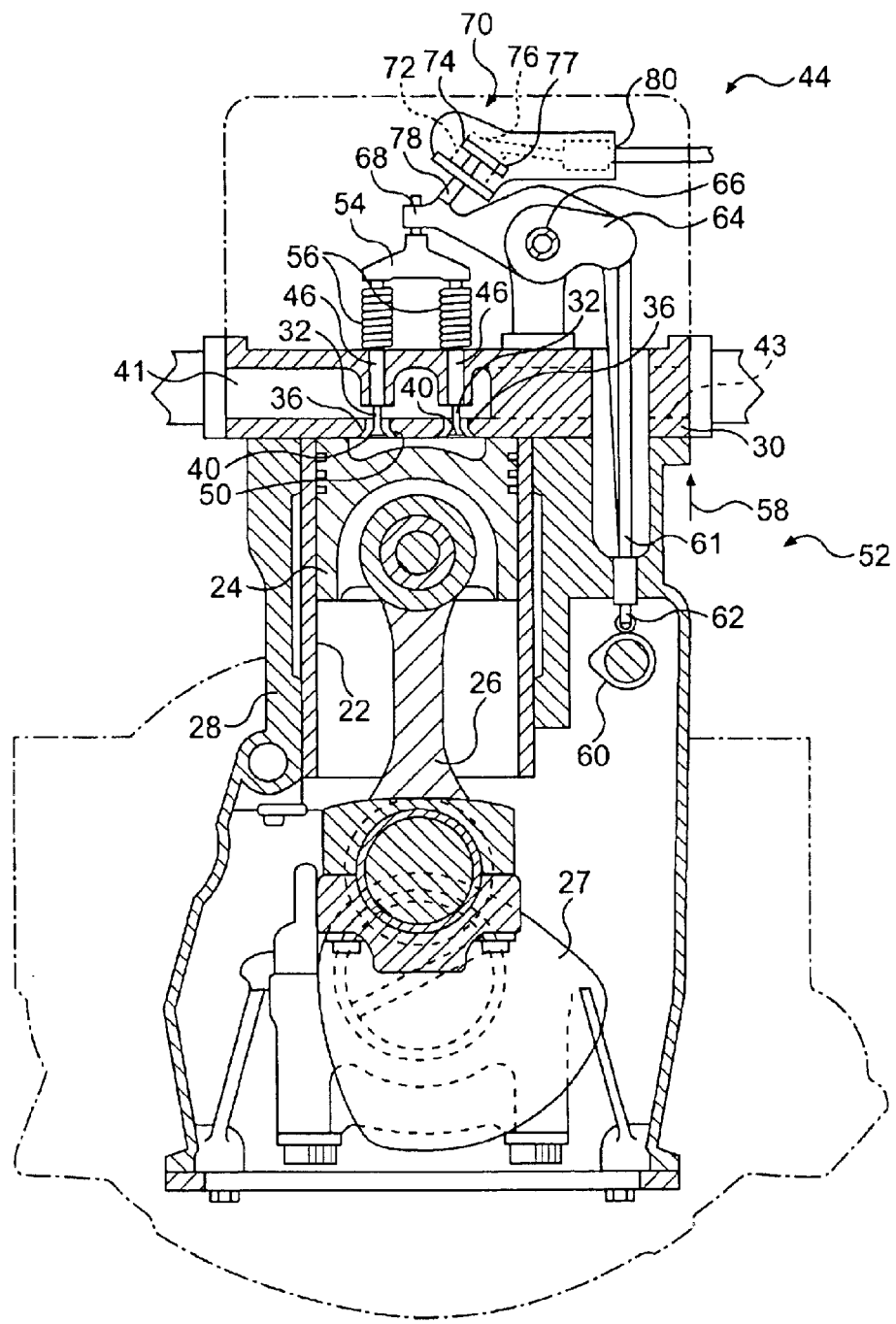
FIG. 3 is a diagrammatic cross-sectional view of a cylinder and valve actuation assembly in accordance with an exemplary embodiment of the present invention.

FIG. 3 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 2) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As shown in FIG. 2, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valve 32 or exhaust valve 34 from a first, or closed, position to a second, or open, position.

In the exemplary embodiment of FIG. 3, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 may also include a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 3, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is moving from a top-dead-center position to a bottom-dead-center position during an intake stroke to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is moving from a bottom-dead-center position to a top-dead-center position in an exhaust stroke to allow exhaust to flow from cylinder 22 into exhaust passageway 43.

As shown in FIG. 3, valve actuation assembly 44 also includes a valve actuator 70. Valve actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

Figure 4:
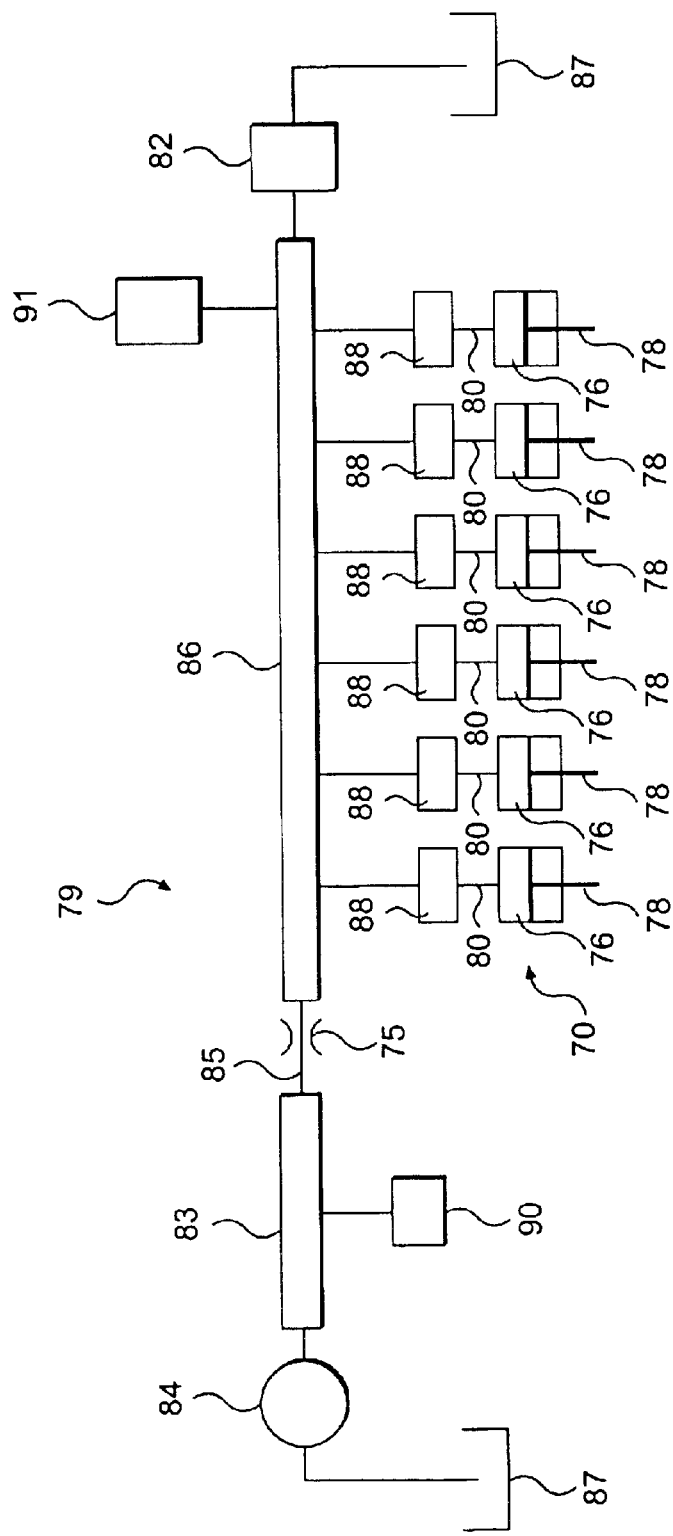
FIG. 4 is a schematic and diagrammatic representation of a fluid supply system for a hydraulic actuator for an engine valve in accordance with an exemplary embodiment of the present invention.

As illustrated in FIGS. 2 and 4, engine system 10 may include a source of fluid 84 to draw fluid from a tank 87 that holds a supply of fluid, which may be, for example, a hydraulic fluid, a lubricating oil, a transmission fluid, or fuel. Source of fluid 84 may increase the pressure of the fluid and direct the fluid into a main gallery 83. Source of fluid 84 and main gallery 83 may be part of a lubrication system, such as typically accompanies an internal combustion engine. Main gallery 83 may contain pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

As shown in FIG. 4, a fluid supply system 79 connects main gallery 83 with valve actuator 70. A restrictive orifice 75 may be positioned in fluid line 85 between main gallery 83 and a first end of fluid rail 86. A control valve 82 may be connected to an opposite end of fluid rail 86 and lead to tank 87. Control valve 82 may be opened to allow a flow of fluid through restrictive orifice 75 and fluid rail 86 to tank 87. Control valve 82 may be closed to allow a build up of pressure in the fluid within fluid rail 86.

As illustrated in FIG. 4, fluid rail 86 supplies pressurized fluid to a series of valve actuators 70. Each valve actuator 70 may be associated with either the intake valves 32 or the exhaust valves 34 of a particular engine cylinder 22 (referring to FIG. 2). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will also recognize that fluid supply system 79 may have a variety of different configurations and include a variety of different components. For example, fluid supply system 79 may include one or more check valves (not shown). A first check valve may be placed in parallel with directional control valve 88 between restrictive orifice 75 and valve actuator 70. A second check valve may be placed in fluid line 85 between main gallery 83 and fluid rail 86. In addition, fluid supply system 79 may include a source of high pressure fluid. Fluid supply system 79 may also include a snubbing valve that controls the rate of fluid flow from valve actuator 70 and a damping system, which may include an accumulator and a restricted orifice, that prevents pressure oscillations in actuator chamber 76 and fluid line 80.

As shown in FIGS. 1 and 2, engine system 10 includes a controller 100 that is connected to each valve actuation assembly 44 and to control valve 82. Controller 100 may include an electronic control module that has a microprocessor and a memory 101. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Figure 5:
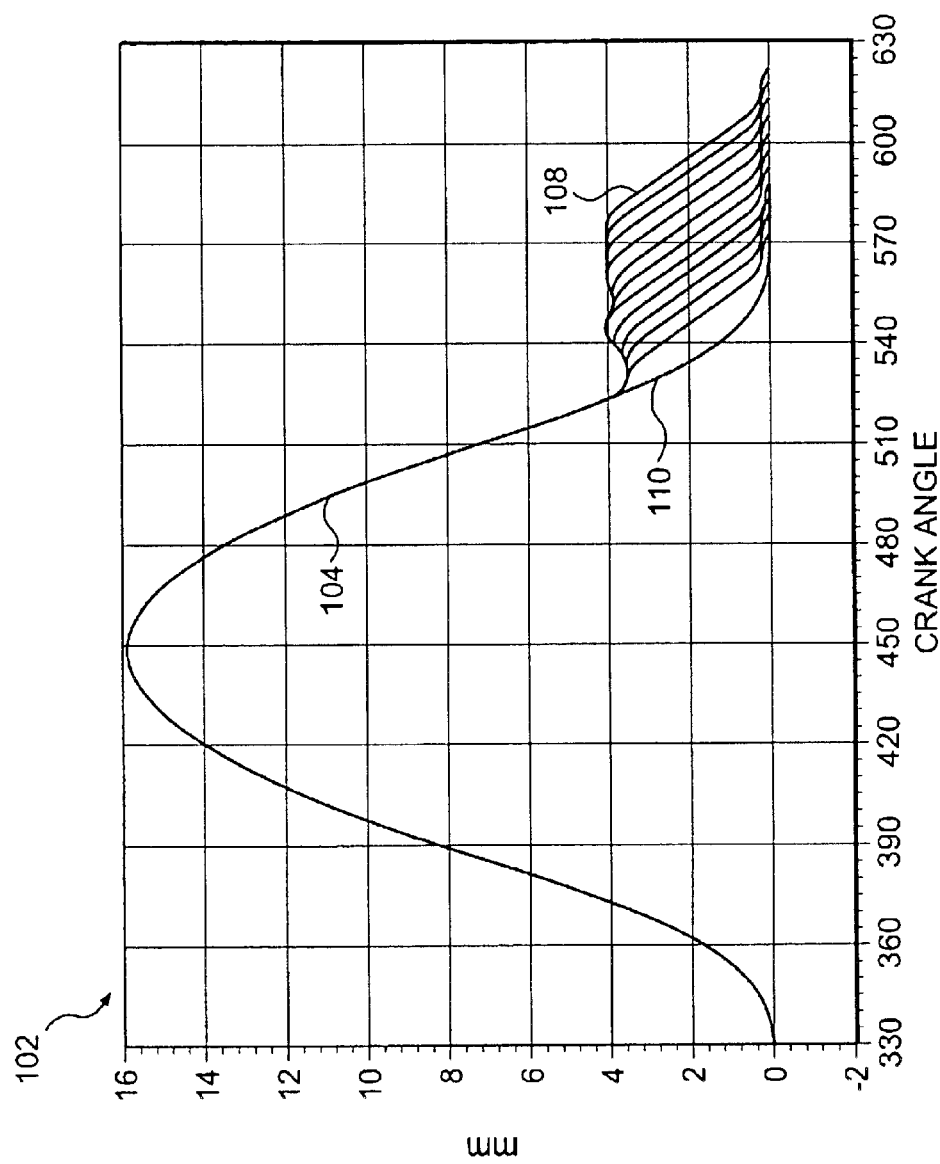
FIG. 5 is a graphic illustration of an exemplary intake valve actuation in accordance with the present invention.

Controller 100 may control valve actuation assembly 44 by transmitting a signal, such as, for example, a current, to directional control valve 88. The transmitted signal may result in the selective opening and/or closing of directional control valve 88. If directional control valve 88 is a normally closed valve, the transmitted signal may cause directional control valve 88 to open for a certain period of time. If directional control valve 88 is a normally open valve, the transmitted signal may cause directional control valve to close for a certain period of time. By controlling the opening and closing of directional control valve 88, controller may control the flow of fluid to and from valve actuator 70 and thereby control the engagement of actuator rod 78 with rocker arm 64 to delay the closing of intake valve 32 for a predetermined period. An exemplary intake valve actuation 104 is illustrated in FIG. 5.

As illustrated in FIGS. 1–4, engine system 10 may include a series of sensors, which are described in greater detail below. Each sensor is configured to monitor a particular operating parameter of engine 20. One skilled in the art may recognize that alternative sensors may be used with engine system 10 to monitor other operating parameters of engine 20.

As shown in FIG. 1, an intake sensor 16 may be disposed in intake passageway 13. Intake sensor 16 may be configured to sense the pressure of the intake air and/or the mass flow rate of the intake air. Intake sensor 16 may be any type of sensor readily apparent to one skilled in the art as capable of sensing these types of parameters and may be disposed at any point along intake passageway 13.

Engine system 10 may also include a pressure sensor 17. Pressure sensor 17 may be configured to sense a pressure representative of the ambient air pressure. Pressure sensor 17 may be any type of sensor readily apparent to one skilled in the art as capable of providing an indication of the ambient air pressure. Controller 100 may use the sensed air pressure to approximate the operating altitude of engine system 10. For example, an air pressure reading of approximately 83 kPa corresponds to an altitude of approximately 1,700 m (5,500 ft) and an air pressure reading of 70 kPa corresponds to an altitude of approximately 3,000 m (10,000 ft). One skilled in the art will recognize that engine system 10 may be equipped with any type of sensor adapted to provide an indication of the operating altitude of engine system 10.

At least one engine sensor 18 may also be operatively connected with engine 20. Engine sensor 18 may be any type of sensor commonly used to monitor an operating parameter of engine 20. For example, engine sensor 18 may be configured to sense the load on engine 20, the amount of fuel being supplied to engine 20, the rotational speed of engine 20, the pressure within one or more cylinders 22, the rotational angle of crankshaft 27, or any other commonly sensed operating parameter. Engine sensor 18 may be any type of sensor readily apparent to one skilled in the art as capable of sensing these types of engine operating parameters.

Memory 101 of controller 100 may store information related to the operation of engine 20 in the form of a "map." For the purposes of the present disclosure, the term "map" is intended to include any electronic storage structure for storing information related to the operation of the engine, such as, for example, data tables, look-up tables, graphs, or any other electronic storage format readily apparent to one skilled in the art. These maps may define optimal engine operating characteristics as a function of engine operating parameters. For example, memory 101 may store a map that defines an optimal air-to-fuel ratio for a particular engine speed and fuel injection quantity. Similarly, memory 101 may store a map that defines an optimal fuel delivery rate for a particular engine speed and load. Memory 101 may other maps, such as, for example, a map that defines limits on the valve actuation period for a particular engine speed and engine load.

Memory 101 may store different versions or variations on each of these maps. For example, memory 101 may store several air-to-fuel ratio maps. In particular, memory 101 may store air-to-fuel ratio maps that identify the optimal air-to-fuel ratio as a function of engine speed and fuel injection quantity for: (1) steady-state conditions at low altitude; (2) transient conditions at low altitude; (3) steady-state conditions at high altitude; (4) transient conditions at high altitude; (5) steady-state conditions at very high altitude; and (6) transient conditions at very high altitude. For the purposes of the present disclosure, low altitude may be considered to include elevations below approximately 1,700 m (5,500 ft), high altitude may be considered to include elevations between approximately 1,700 m (5,500 ft) and 3,000 m (10,000 ft), and very high altitude may be considered to include elevations above approximately 3,000 m (10,000 ft). One skilled in the art will recognize that other elevations may be used to differentiate between these maps.

Figure 6A:
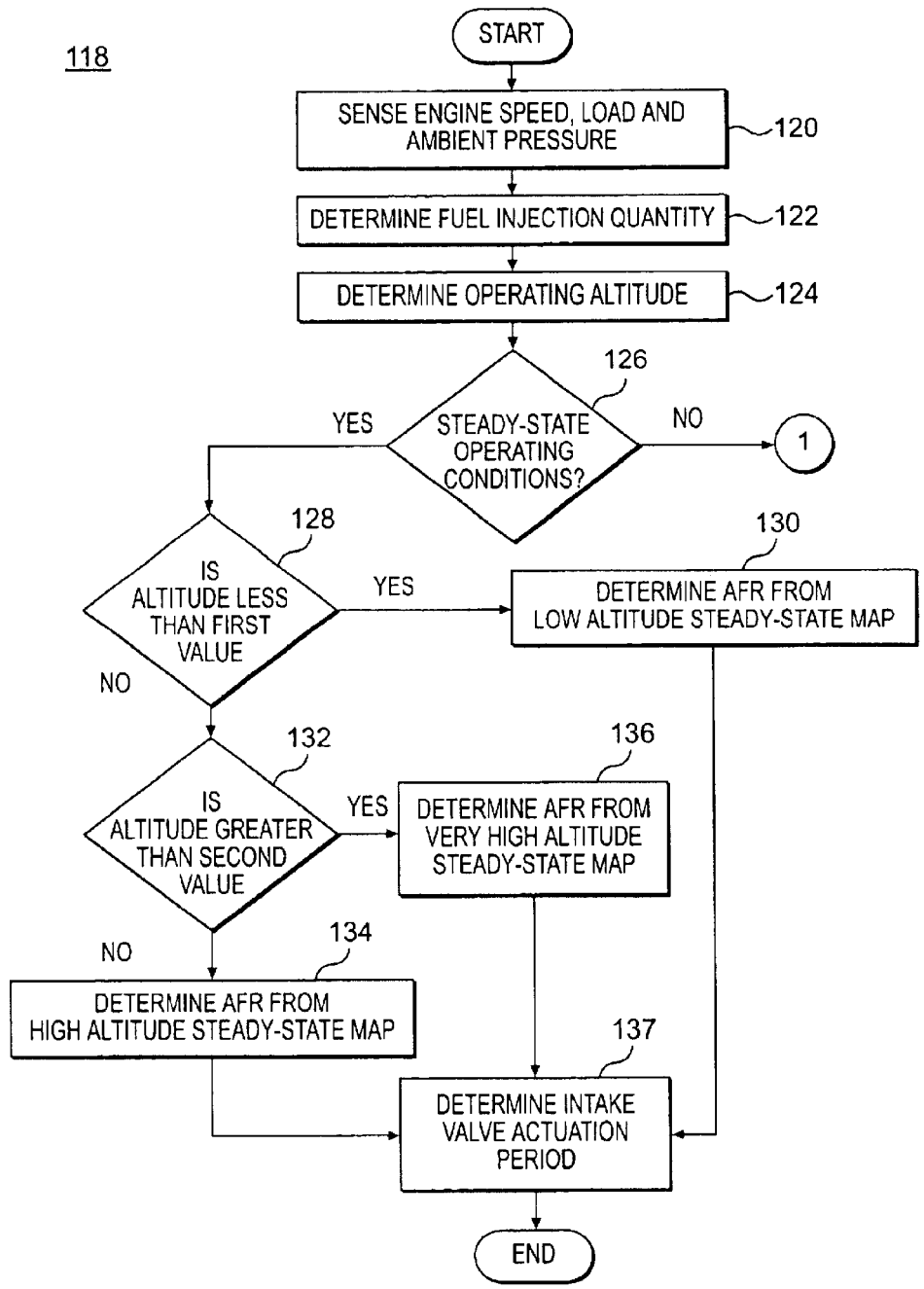
FIGS. 6a and 6b are a flowchart illustrating an exemplary method for controlling a variable valve actuation system in accordance with the present invention.
Figure 6B:
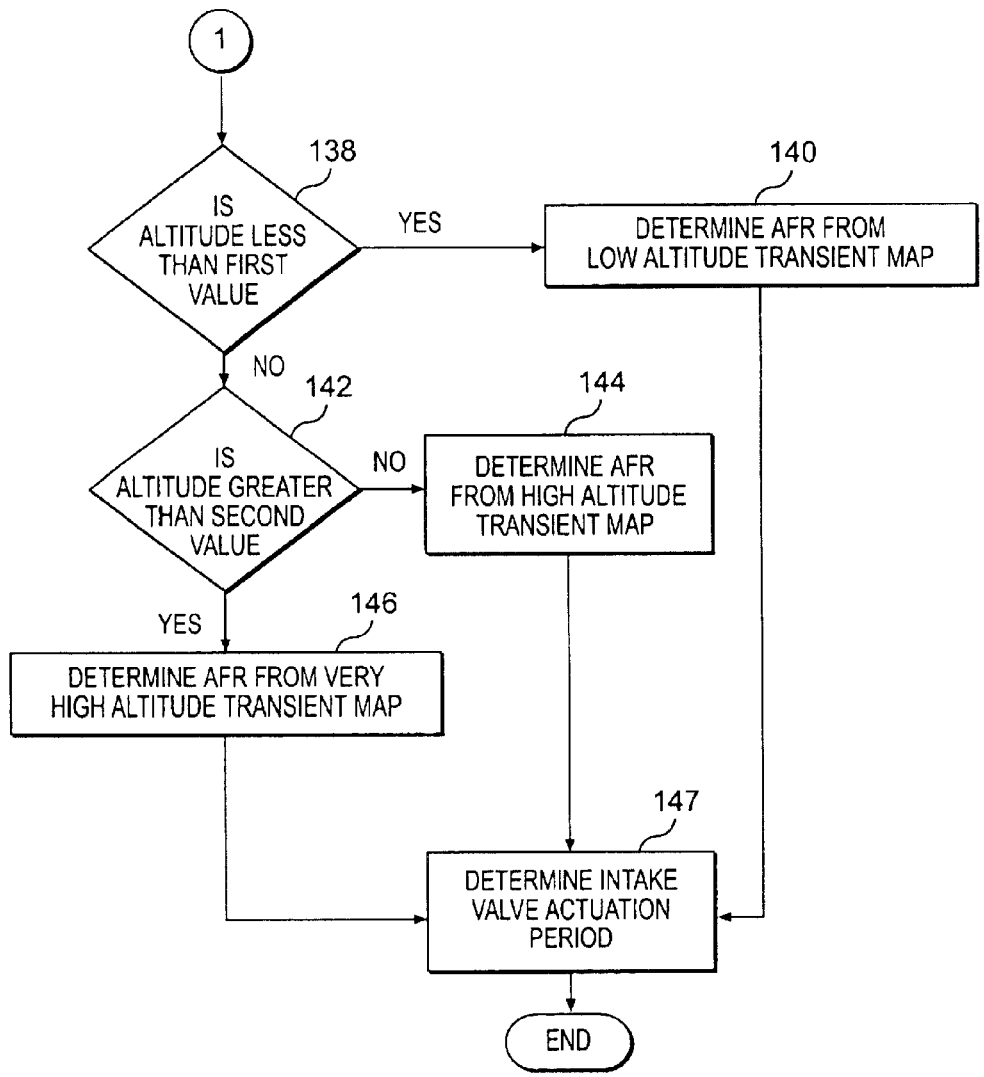

Controller 100 may use the information provided by the sensors to access the maps stored in memory 101 to identify an optimal air-to-fuel ratio and an optimal intake valve actuation period for the current engine operating conditions. The flowcharts of FIGS. 6a and 6b illustrate an exemplary method 118 of determining an optimal air-to-fuel ratio and an intake valve actuation period.

Industrial Applicability

Controller 100 may selectively operate valve actuator 70 to implement a late intake type Miller cycle in engine 20. When operating under the late intake Miller cycle, controller 100 operates valve actuator 70 to delay the closing of intake valve 32 from a conventional closing, where the closing substantially coincides with the end of an intake stroke, to a delayed closing, where intake valve 32 is held open for a predetermined portion of a compression stroke. The duration of the intake valve actuation period may be determined based on the current operating conditions of engine 20.

As described above, cam assembly 52 controls the initial actuation timing of intake valves 32. As cam 60 and push rod 61 start to pivot rocker arm 64, controller 100 ensures control valve 82 and directional control valve 88 are in an open position. This allows pressurized fluid to flow from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. Fluid supply system 79 may be configured to provide a sufficient flow of fluid to actuator chamber 76 to ensure that actuator chamber 76 is filled with fluid before cam 60 returns intake valve 32 to the closed position.

Controller 100 may actuate valve actuator 70 by closing directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, valve actuator 70 will hold intake valves 32 in the open position, independently of the action of cam assembly 52.

Controller 100 may disengage valve actuator 70 to allow intake valves 32 to close by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position.

As illustrated in FIG. 5, operation of valve actuator 70 may extend intake valve actuation 104 from a conventional closing 110 to a delayed closing 108. The period, or duration, of the extended intake valve actuation may be measured in terms of the angle of rotation of crankshaft 27, as a function of time, or in any other manner readily apparent to one skilled in the art. When implementing a late intake type Miller cycle, the extended intake valve actuation period may be between about 0° and 120° crankshaft rotation. One skilled in the art will recognize, however, that valve actuator 70 may be used to implement other types of valve actuation timing variations.

Controller 100 may vary the intake valve actuation period to achieve optimum engine performance based upon the current operating conditions of engine 20 and/or the altitude at which engine 20 is operating. For example, when engine 20 is operating at a low elevation, the optimal duration of the valve actuation period may be shorter than when engine 20 is operating at a higher elevation. The flowchart of FIGS. 6a and 6b illustrate one exemplary method of determining the intake valve actuation period based on the operating elevation of engine 20.

Controller 100 may receive information about the current operating conditions of engine 20 from the various sensors. For example, controller 100 may receive an indication of the current engine speed, the current engine load, and the ambient air pressure. (Step 120). Controller 100 may also receive information regarding additional operating parameters of engine 20, such as, for example, an intake manifold pressure, an in-cylinder pressure, or an operating fluid temperature.

Controller 100 may then determine a fuel injection quantity. (Step 122). Controller 100 may use the current engine load and speed to access a lookup map that stores the fuel injection quantity as a function of engine load and speed. The fuel injection quantity may represent the total quantity of fuel that is injected into cylinder 22 during a particular operating cycle, including any "pilot injection."

Controller 100 may also determine the operating altitude of engine 20. (Step 124). Controller 100 may use the ambient air pressure to determine the operating altitude of engine 20. For example, an ambient air pressure of about 83 kPa indicates that engine 20 is operating at approximately 1,700 m (5,500 ft) and an ambient air pressure of about 70 kPa indicates that engine 20 is operating at approximately 3,000 m (10,000 ft). Controller 100 may use any conversion routine readily apparent to one skilled in the art to translate the sensed ambient air pressure, or other such sensed operating parameter, into an approximate operating altitude.

Controller 100 may also determine if engine 20 is operating in a steady-state condition or a transient condition. (Step 126). Controller 100 may make this determination based on a comparison between the current values of the sensed operating parameters and previous values of the operating parameters. For example, an increase in the engine speed or engine load may indicate that engine 20 is experiencing a transient condition. One skilled in the art will recognize that various parameters and/or analysis may be used to make this determination.

If engine 20 is operating in steady-state conditions, controller 100 determines if the operating altitude of engine 20 is below a first predetermined value that indicates that engine 20 is operating at a low altitude. (Step 128) For example, a low altitude may be considered to be altitudes between approximately sea level and approximately 1,700 m (5,500 ft). If the operating altitude is below the first predetermined value, controller 100 may access a lookup map for low altitude steady-state conditions to determine the desired air-to-fuel ratio. (Step 130). The lookup map may store the desired air-to-fuel ratio as a function of engine speed and fuel injection quantity.

If the operating altitude of engine 20 is above the first predetermined value, controller 100 may compare the operating altitude to a second predetermined value. (Step 132). The second predetermined value may be set to indicate a very high operating altitude. For example, a very high altitude may be an altitude above approximately 3,000 m (10,000 ft). If engine 20 is operating above the first predetermined value and below the second predetermined value, controller 100 may access a lookup map for high altitude steady-state conditions to determine the desired air-to-fuel ratio. (Step 134) If engine 20 is operating above the first and second predetermined values, controller 100 may access a lookup map for very high altitude steady-state conditions to determine the desired air-to-fuel ratio. (Step 136)

If the operating altitude of engine 20 is between sea level and the first predetermined value or between the first predetermined value and the second predetermined value, controller 100 may interpolate the desired air-to-fuel ratio from the corresponding lookup maps. For example, if engine 20 is operating at approximately 2,500 m (8,200 ft) controller 100 may obtain the air-to-fuel ratio for the current engine speed and fuel quantity from both the high altitude steady-state map and the very high altitude steady state map. Controller 100 may interpolate between the two air-to-fuel ratio values using the assumption that the desired air-to-fuel ratio varies linearly between the high altitude value and the very high altitude value. It should be noted that controller 100 may use another approach to interpolating the desired air-to-fuel ratio such as, for example, any type of numerical or statistical analysis or model.

Controller 100 may determine the intake valve actuation period. (Step 137). The intake valve actuation period may be expressed as a function of the engine speed (ES), the intake air pressure (IP), and the desired airflow (AF). For example, the intake valve actuation period (P) maybe determined by the following equation:

$$P = A + B(ES) + C(ES)^2 + D(IP) + E(IP)^2 + F(AF) + G(AF)^2 + H(ES)(IP)(AF)$$

Where A, B, C, D, E, F, G, and H are constants. For example, the values of these constants may be as follows: A=342.03; B=−0.213; C=6.27E−5; D=−1.215; E=0.00141; F=12.14; G=−0.0558; and H=−5.27E−1.

The above formula will yield an intake valve actuation period, P, that is expressed in terms of an engine crank angle. The determined crank angle may represent the angle at which the current to directional control valve 88 should be terminated to open directional control valve 88 and release valve actuator 70. Alternatively, the determined crank angle may represent the angle at which intake valve actuator 70 should be returned to the closed position. In the latter example, controller 100 may then determine the engine crank angle at which to terminate the current to directional control valve 88 based on a constant that is indicative of the time required for the intake valve 32 to close after the current to directional control valve 88 has been terminated. One skilled in the art may recognize that different formulas and/or constants may be developed to present different representations of the valve actuation period. For example, valve actuation period may be expressed as an amount of a rotation of crankshaft or a time period.

If controller 100 determines that engine 20 is operating under transient conditions (referring to Step 126 in FIG. 6a), controller 100 may access lookup maps that store air-to-fuel ratios for transient conditions. The operating altitude of engine 20 may be compared to the first predetermined value indicating a low altitude operation. (Step 138, FIG. 6b) The first predetermined value may be equivalent to the first predetermined value used in the steady-state process described above. If the operating altitude is below the first predetermined value, controller 100 may access a lookup map for low altitude transient conditions to determine the desired air-to-fuel ratio. (Step 140).

If the operating altitude of engine 20 is above the first predetermined value, controller 100 may compare the operating altitude to a second predetermined value. (Step 142). The second predetermined value may be set to indicate a very high operating altitude and may be equivalent to the second predetermined value used in the steady-state process described above. If engine 20 is operating above the first predetermined value and below the second predetermined value, controller 100 may access a lookup map for high altitude transient conditions to determine the desired air-to-fuel ratio. (Step 144) If engine 20 is operating above the first and second predetermined values, controller 100 may access a lookup map for very high altitude steady-state conditions to determine the desired air-to-fuel ratio. (Step 146).

If the operating altitude of engine 20 is between sea level and the first predetermined value or between the first predetermined value and the second predetermined value, controller 100 may interpolate the desired air-to-fuel ratio from the corresponding lookup maps. Controller 100 may perform the interpolation process as described above. Alternatively, controller 100 may use another approach to interpolating the desired air-to-fuel ratio such as, for example, any type of numerical or statistical analysis or model.

Controller 100 may determine the intake valve actuation period for transient conditions. (Step 147). The intake valve actuation period may be determined in terms of a crank angle as described above.

Controller 100 may then control directional control valve 88 to actuate valve actuator 70 to achieve the desired valve actuation period by closing intake valves 32 at the determined crank angle. Controller 100 may continuously monitor the operating parameters and altitude of engine 20 and adjust the intake valve actuation period accordingly. In this manner, controller 100 may optimize the air-to-fuel ratio based on the current operating conditions and altitude of engine 20.

As will be apparent, the above-described method provides for the control of a variable valve actuation assembly for an internal combustion engine to account for performance variations due to changes in altitude. The described method provides for the optimization of the air-to-fuel ratio supplied to the engine based on the operating conditions and altitude of the engine. The air-to-fuel ratio may be optimized based on the current operating altitude to improve the performance of the engine and/or reduce the amount of emissions generated by the engine.

It will be apparent to those skilled in the art that various modifications and variations can be made in the described system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An engine, comprising:
   an engine block defining at least one cylinder;
   a piston slidably disposed within the at least one cylinder;
   an intake valve moveable between a first position where the intake valve prevents a flow of fluid to the at least one cylinder and a second position where the intake valve allows a flow of fluid to the at least one cylinder;
   a cam assembly connected to the intake valve to move the intake valve between the first position and the second position;
   a valve actuator selectively operable to prevent the intake valve from returning to the first position;
   a sensor operable to sense an operating parameter of the engine; and
   a controller having a memory adapted to store a first lookup map and a second lookup map, the controller operable to access the first lookup map to determine a desired air-to-fuel ratio when the sensed parameter indicates that the engine is operating at an altitude below a first predetermined value and to access the second lookup map to determine a desired air-to-fuel ratio when the sensed parameter indicates that the engine is operating at an altitude above the first predetermined value, the controller further operable to determine a desired valve actuation period based on the determined air-to-fuel ratio and to prevent the intake valve from returning to the first position until the end of the determined valve actuation period.

2. The engine of claim 1, wherein the memory is adapted to store a third lookup map and the controller accesses the third lookup map when the sensed parameter indicates that the engine is operating at an altitude above a second predetermined value.

3. The engine of claim 2, wherein the first predetermined value is approximately 1700 m and the second predetermined value is approximately 3000 m.

4. The engine of claim 2, wherein the memory of the controller is adapted to store
   a fourth lookup map defining the desired air-to-fuel ratio when the engine is experiencing transient conditions and the sensed parameter indicates that the engine is operating at an altitude below the first predetermined value; and
   a fifth lookup map defining the desired air-to-fuel ratio when the engine is experiencing transient conditions and the sensed parameter indicates that the engine is operating at an altitude above the first predetermined value and below the second predetermined value; and
   a sixth lookup map defining the desired air-to-fuel ratio when the engine is experiencing transient conditions and the sensed parameter indicates that the engine is operating at an altitude above the second predetermined value.

5. The engine of claim 1, wherein the sensor is a pressure sensor adapted to sense a pressure representative of the atmospheric pressure.

6. The engine of claim 1, wherein each of the first and second lookup maps define the desired air-to-fuel ratio as a function of an engine speed and a fuel injection quantity.

7. The engine of claim 6, further including a second sensor adapted to sense a speed of the engine and a third sensor adapted to sense a load on the engine and wherein the controller is adapted to determine the fuel injection quantity based on the engine speed and the engine load.

8. An intake valve actuation system for an engine, comprising:
   an intake valve moveable between a first position where the intake valve prevents a flow of fluid and a second position where the intake valve allows a flow of fluid;
   a cam assembly connected to the intake valve to move the intake valve between the first position and the second position;
   a valve actuator selectively operable to prevent the intake valve from returning to the first position;

a sensor operable to sense a parameter indicative of an altitude at which the engine is operating; and a controller having a memory adapted to store a first lookup map and a second lookup map, the controller operable to access the first lookup map to determine a desired air-to-fuel ratio when the sensed parameter indicates that the engine is operating at an altitude below a first predetermined value and to access the second lookup map to determine a desired air-to-fuel ratio when the sensed parameter indicates that the engine is operating at an altitude above the first predetermined value, the controller further operable to determine a desired valve actuation period based on the determined air-to-fuel ratio and to prevent the intake valve from returning to the first position until the end of the determined valve actuation period.

9. The system of claim 8, wherein the memory is adapted to store a third lookup map and the controller accesses the third lookup map when the sensed parameter indicates that the engine is operating at an altitude above a second predetermined value.

10. The system of claim 9, wherein the first predetermined value is approximately 1700 m and the second predetermined value is approximately 3000 m.

11. The system of claim 9, wherein the memory of the controller is adapted to store a fourth lookup map defining the desired air-to-fuel ratio when the engine is experiencing transient conditions and the sensed parameter indicates that the engine is operating at an altitude below the first predetermined value; and a fifth lookup map defining the desired air-to-fuel ratio when the engine is experiencing transient conditions and the sensed parameter indicates that the engine is operating at an altitude above the first predetermined value and below the second predetermined value; and a sixth lookup map defining the desired air-to-fuel ratio when the engine is experiencing transient conditions and the sensed parameter indicates that the engine is operating at an altitude above the second predetermined value.

12. The system of claim 8, wherein the sensor is a pressure sensor adapted to sense a pressure representative of the atmospheric pressure.

13. The system of claim 8, wherein each of the first and second lookup maps define the desired air-to-fuel ratio as a function of an engine speed and a fuel injection quantity.

14. The system of claim 13, further including a second sensor adapted to sense a speed of the engine and a third sensor adapted to sense a load on the engine and wherein the controller is adapted to determine the fuel injection quantity based on the engine speed and the engine load.

15. A method of controlling a variable valve actuation system for an engine, comprising:

operating a cam assembly to move an intake valve between a first position where the intake valve blocks a flow of fluid and a second position where the intake valve allows a flow of fluid;

sensing a parameter indicative of an altitude at which the engine is operating;

accessing a first lookup map to determine a desired air-to-fuel ratio when the sensed parameter indicates that the engine is operating at an altitude below a first predetermined value;

accessing a second lookup map to determine a desired air-to-fuel ratio when the sensed parameter indicates that the engine is operating at an altitude above the first predetermined value;

determining a desired valve actuation period based on the determined air-to-fuel ratio;

preventing the intake valve from returning to the first position in response to operation of the cam assembly; and allowing the intake valve to return to the first position at the end of the determined valve actuation period.

16. The method of claim 15, further including accessing a third lookup map to determine a desired air-to-fuel ratio when the sensed parameter is indicates that the engine is operating at an altitude above a second predetermined value.

17. The method of claim 16, wherein the first predetermined value is approximately 1700 m and the second predetermined value is approximately 3000 m.

18. The method of claim 15, wherein the sensed parameter is a pressure representative of the atmospheric pressure.

19. The method of claim 15, wherein the desired valve actuation period is determined as a function of an engine speed, an intake air pressure, and the desired air fuel ratio.

20. The method of claim 15, wherein the desired valve actuation period is determined in terms of a crankshaft rotational angle at which the valve actuator is to be released.

21. The method of claim 20, wherein the valve actuation period extends the closing of the intake valve by a predetermined number of degrees of a rotation of a crankshaft.

22. The method of claim 15, wherein each of the first and second lookup maps store the air-to-fuel ratio as a function of an engine speed and a fuel injection quantity and the method further includes:

sensing a speed of the engine;

sensing a load on the engine; and calculating a fuel injection quantity.

* * * * *